9394X
No printed specification available
J. E. Thomas.
Churn.
Patented Feb. 12, 1836.
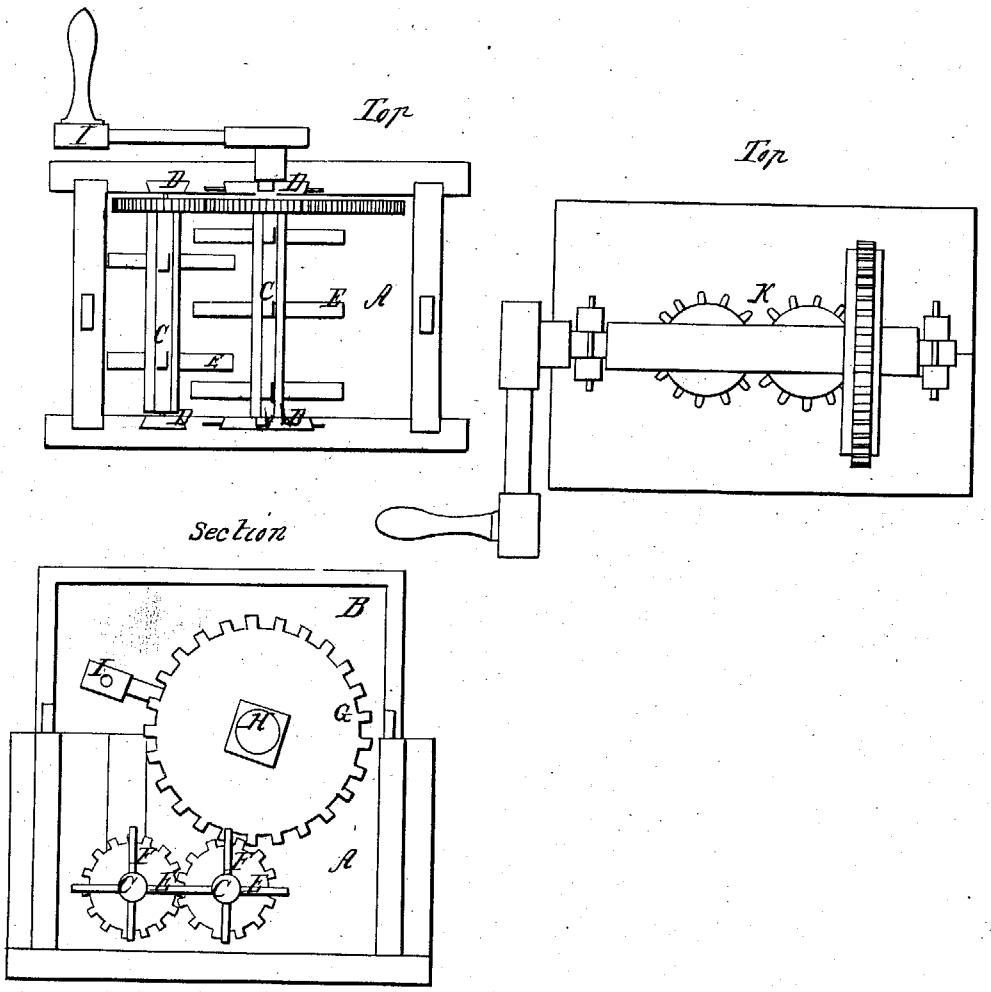

9344X

Feb. 12. 1836

57.

John C. Thomas. Winchester Ohio.

Letters Patent.

The Schedule referred to in these Letters Patent and making
part of the same containing a description in the words of the said
John C. Thomas himself of his improvement in the Churn.

Be it known that I John C. Thomas of the Town of Winchester
in the County of Preble and State of Ohio, have made a new and
useful improvement in the Churn, which is described as follows
reference being had to the annexed drawing of the same, as
making part of this specification. This improvement consists
in having a water tight box A about two feet long, one foot
wide, and one foot 6 inches deep, or of any convenient size
covered tightly with a cover or lid B. within this box are
placed parallel to each other two shafts C C. turning on gud-
geons in holes, made in slides D D D D. let into dovetailed
grooves in the sides of the box. Into these shafts are inser-
ted a convenient number of dashers or arms E. working
between each other, and in the ends of said shafts are cog
wheels F F. working into each other, turning them in con-
trary directions. Above and working into one of
these cog wheels is a larger cog wheel G turning on a shaft
H. which projects through the side of the box sufficiently far
to receive a crank handle I. by which it is turned. The lid
being removed the cream is put into the box and the lid re-
placed and secured, the crank handle is then turned,
which turns the larger cog wheel, this turns the small cog
wheel which turns the other small cog wheel & thus the
shafts and dashers are turned in opposite directions,
which agitate and break the cream and form the butter.
The lid is again removed and the shafts and cog wheels
taken

9594X

58 taken [illegible] from the box by raising the dovetailed slides from the grooves. The box is then emptied of its contents in the most convenient manner. The shafts may be turned in a vertical position with the cog wheels working horizontally on the outside of the box as at K.

What I claim as my invention and desire to secure by Letters Patent consists in the arrangement and adaptation of the several parts of the before described churn.

Witnesses
William W. Thomas
William P. Elliot

John C. Thomas

415 [illegible]

Ex'd [illegible]

Drawing